(12) United States Patent
Pfaff et al.

(10) Patent No.: US 7,169,223 B1
(45) Date of Patent: Jan. 30, 2007

(54) EFFECT PIGMENTS HAVING A STRONG COLOR FLOP

(75) Inventors: Gerhard Pfaff, Muenster (DE); Cornelia Foerderer, Heppenheim (DE); Doreen Warthe, Griesheim (DE); Johann Dietz, Dietzenbach (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 11/332,512

(22) Filed: Jan. 17, 2006

(30) Foreign Application Priority Data

Jan. 17, 2005 (DE) .................. 10 2005 001 977

(51) Int. Cl.
*C09C 1/28* (2006.01)
*C09C 3/06* (2006.01)

(52) U.S. Cl. .................. 106/482; 106/446; 106/457; 106/491

(58) Field of Classification Search ........... 106/446, 106/457, 482, 491
See application file for complete search history.

(56) References Cited

U.S. PATENT DOCUMENTS 5,753,024 A * 5/1998 Vogt et al. ............... 106/417
6,630,018 B1 10/2003 Bauer et al.
6,656,259 B1 * 12/2003 Pfaff et al. ............... 106/415

FOREIGN PATENT DOCUMENTS

| JP | 7-228515 A | * | 8/1995 |
| JP | 9-71417 A | * | 3/1997 |
| WO | WO 93/08237 | | 4/1993 |

* cited by examiner

*Primary Examiner*—Anthony J. Green
(74) *Attorney, Agent, or Firm*—Millen, White, Zelano & Branigan, P.C.

(57) ABSTRACT

The present invention relates to effect pigments having a color flop comprising metal oxide-coated $SiO_2$ flakes having a uniform layer thickness, where the color flop runs through all four quadrants of the a,b color coordinate system (CIELAB L,a,b system). The present invention likewise relates to processes for the preparation of these pigments in which $SiO_2$ flakes having a uniform layer thickness are coated with metal oxides, and to the use of these pigments in cosmetics, paints, coatings, plastics, films, in security printing, in security features in documents and identity papers, for coloring seed, for coloring foods or in medicament coatings and for the preparation of pigment compositions and dry preparations.

15 Claims, 1 Drawing Sheet

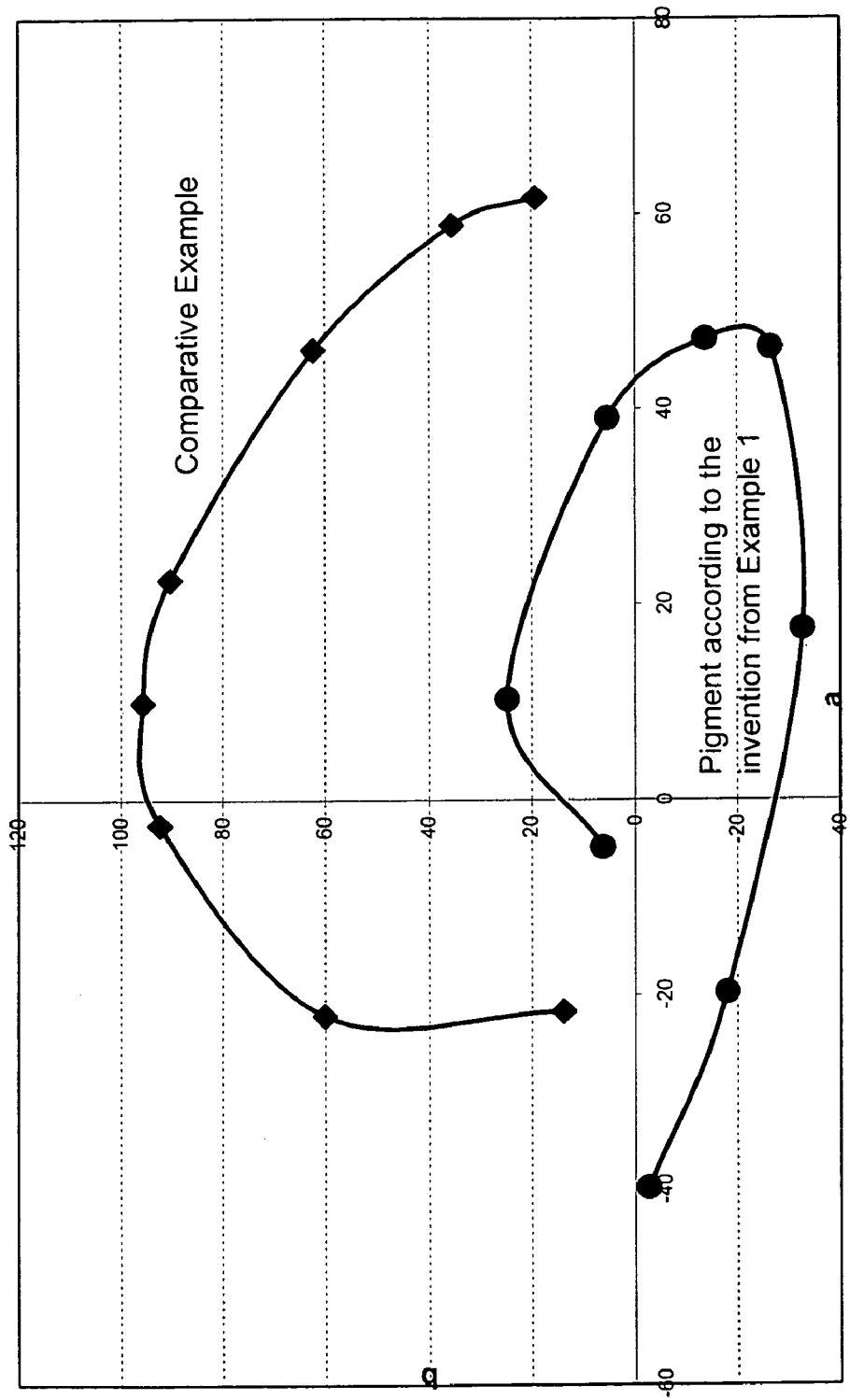
Figure 1: Comparison of the colour changes in the a,b colour system

EFFECT PIGMENTS HAVING A STRONG COLOR FLOP

The present invention relates to effect pigments having a colour flop comprising metal oxide-coated $SiO_2$ flakes having a uniform layer thickness, where the colour flop runs through all four quadrants of the a,b colour coordinate system (CIELAB L,a,b system). The present invention likewise relates to processes for the preparation of these pigments in which $SiO_2$ flakes having a uniform layer thickness are coated with metal oxides, and to the use of these pigments in cosmetics, paints, coatings, plastics, films, in security printing, in security features in documents and identity papers, for colouring seed, for colouring foods or in medicament coatings and for the preparation of pigment compositions and dry preparations.

The use of lustre or effect pigments is widespread. Pigments of this type have become indispensable in automobile paints, decorative coatings of all types and in the colouring of plastics, in paints and printing inks, in particular inks for security printing, and in applications in decorative cosmetics. In the matrix surrounding them, these pigments ideally align themselves parallel to the surface of the coating and exhibit their optical action through a complex interplay of interference, reflection and absorption of the incident light. A bright colour, changes between different colours depending on the viewing angle, so-called colour flops, or varying brightness impressions are the focus of interest for the various applications.

Pigments of this type are generally prepared by coating flake-form metallic or non-metallic substrates with metal-oxide or metal layers. Most of these pigments are based on flake-form substrates comprising metals or natural phyllosilicates, such as mica, talc or glass.

The phyllosilicates in particular have the disadvantage here that the thickness of the substrate varies in a broad range and cannot be set specifically, with the result that light transmission and reflection at the substrate take place in a substantially uncontrollable manner, even in the case of transparent substrates, and therefore cannot be utilised in a specific manner.

WO 93/08237 discloses effect pigments based on $SiO_2$ flakes which can be prepared with relatively low layer-thickness variance by means of a belt technology. The thickness of the $SiO_2$ flakes described therein is usually between 200 nm and 2 µm.

The pigments disclosed hitherto do not enable all desired effects to be achieved, and there is consequently a constant demand for novel pigments which can be employed universally in a very wide variety of applications and exhibit novel and interesting colour effects. In particular, there is considerable interest in effect pigments which exhibit a strong colour flop. This change between various colours as a function of the viewing angle is increasingly gaining in importance in the decorative design of everyday articles, and there is consequently a constant demand for pigments having novel colour changes. The colour-flop pigments disclosed hitherto exhibit colour changes only in adjacent colour regions. Effect pigments having a colour change encompassing the colours in all four quadrants of the a,b colour coordinate system (CIELAB L,a,b system) are not known, and there is consequently a great demand for effect pigments which exhibit these effects.

The object was therefore to find effect pigments having improved optical properties, in particular having a strong colour flop, which can be employed universally in a very wide variety of applications.

The above-mentioned object is achieved by pigments in accordance with the present invention. The present invention accordingly relates to effect pigments having a colour flop comprising metal oxide-coated $SiO_2$ flakes having a uniform layer thickness, where the colour flop runs through all four quadrants of the a,b colour coordinate system (CIELAB L,a,b system).

The assessment of the colour properties of the pigments according to the invention is carried out in the present invention in accordance with the a,b colour coordinate system, which is also known as the CIELAB L,a,b system. The CIEL*a*b* colour system is the best-known and most widespread colour system. In the CIELAB model, all hues of equal lightness lie on a circular, flat plane on which the a and b axes are located perpendicular to one another. The plane is thus divided into quadrants by the a and b axes. Positive a values are reddish, negative a values are greenish, positive b values are yellowish and negative b values are blueish. If a colour is defined in the CIELAB, a describes the red/green value and b describes the yellow/blue value. The pure hues with high saturation lie on the periphery of the colour disc. The saturation drops on moving inwards towards the axis, where it is zero (uncoloured, grey). Complementary colours are opposite one another.

The present invention likewise relates to processes for the preparation of these pigments in which $SiO_2$ flakes having uniform layer thickness are coated with metal oxides.

Surprisingly, it has been found that effect pigments in accordance with the present invention exhibit hitherto unachieved colour changes which extend over all four quadrants of the a,b colour coordinate system. The provision of these novel effect pigments enables the designer to incorporate particular colour effects in the design in all areas of application known to the person skilled in the art. Depending on the layer thicknesses selected for the $SiO_2$ layers and the metal oxides applied thereto, the colour curve can start or end at different colours. For example, on use of iron oxide as metal oxide, the absorbent properties of this material mean that, when viewed from different viewing angles, colour curves are observed which are characterised by additional superposition of absorption and interference and by greater hiding power. As a further advantage, it is apparent here that the effect pigments in accordance with the present invention are transparent to semi-transparent. This allows a particularly broad latitude for mixtures of these pigments with other transparent, but also with opaque pigments for specifically setting particular colouristics of an application system with angle dependence of the colour. The low overall thickness of the pigment particles makes them appear suitable for all applications, including demanding coating systems.

Owing to the advantageous properties, the effect pigments according to the invention are universally suitable for a large number of widely varying applications. The present invention accordingly also relates to the use of these pigments in cosmetics, paints, coatings, plastics, films, in security printing, in security features in documents and identity papers, for colouring seed, for colouring foods or in medicament coatings and for the preparation of pigment compositions and dry preparations.

The pigments according to the invention are based on synthetic $SiO_2$ flakes which have a uniform layer thickness and are preferably prepared in accordance with International Application WO 93/08237, which corresponds to U.S. Pat. No. 6,630,018, by solidification and hydrolysis of a water-glass solution on a continuous belt. The methods for preparing the synthetic $SiO_2$ flakes in WO 93/08237 and U.S.

Pat. No. 6,630,018 are incorporated herein by reference. The term uniform layer thickness here is taken to mean a layer-thickness tolerance of less than about 10%, e.g., from 3 to 10%, preferably from 3 to 5%, of the total dry layer thickness of the particles. The flake-form silicon dioxide particles are generally in amorphous form. Synthetic flakes of this type have the advantage over natural materials, such as, for example, mica, that the layer thickness can be adjusted with respect to the desired effects and the layer-thickness tolerance is limited. This advantage is essential for the desired colour flop since even slightly greater deviations in the layer-thickness distribution restrict the extent of the colour-flop curves, making it impossible to observe a colour flop over all four quadrants of the a,b colour coordinate system.

The diameter of the $SiO_2$ flakes is usually between 1 and 250 µm, preferably between 2 and 100 µm. Their thickness is between 520 and 560 nm and preferably from 530 to 550 nm. The average aspect ratio of the flake-form $SiO_2$ flakes, i.e. the ratio of the average length measurement value, which here corresponds to the average diameter, to the average thickness measurement value, is usually from 5 to 200, preferably from 20 to 150 and particularly preferably from 30 to 120.

The said $SiO_2$ flakes in the pigments according to the invention are coated with metal-oxide layers, such as, for example, titanium dioxide, iron oxide, zirconium oxide, suboxides, for example of titanium, and/or mixtures of the said materials. The present list does not exclude the use of further metal oxides. The metal oxide is particularly preferably iron oxide and/or titanium dioxide. The iron oxide here is preferably in the form of haematite ($\alpha$-$Fe_2O_3$) and the titanium dioxide is preferably in the rutile modification. The thickness of the metal-oxide layers is from 15 to 40 nm, preferably from 20 to 35 nm. Through a suitable choice of the metal oxides and the layer thicknesses, as well as the uniform flake thicknesses, the starting and end points of the colour curves can be determined and the colour flop effect achieved.

In an embodiment of the invention, the $SiO_2$ flakes have a thickness of 520 to 560 nm, preferably 530 to 550 nm, with a thickness tolerance of less than about 10%, which are coated with a metal oxide coating having a thickness of 15 to 40 nm, preferably 20 to 35 nm. Pigments according to this embodiment include, e.g., 530 nm $SiO_2$+20 nm $Fe_2O_3$; 530 nm $SiO_2$+35 nm $Fe_2O_3$; 555 nm $SiO_2$+20 nm $Fe_2O_3$; and 555 nm $SiO_2$+35 nm $Fe_2O_3$, etc. When the flake thickness is changed, it is not necessary to change the metal oxide coating thickness.

In a further embodiment of the present invention, the effect pigments according to the invention can furthermore be provided with an additional stabilising organic coating as outer layer. Examples of such coatings are given, for example, in EP 0 632 109, U.S. Pat. No. 5,759,255, DE 43 17 019, DE 39 29 423, DE 32 35 017, EP 0 492 223, EP 0 342 533, EP 0 268 918, EP 0 141 174, EP 0 764 191, WO 98/13426 or EP 0 465 805, the disclosure content of which is incorporated herein by way of reference. Effect pigments comprising an organic coating, for example of organosilanes or organotitanates or organozirconates, additionally, besides the above-mentioned optical properties, exhibit increased stability to weathering influences, such as, for example, moisture and light, which is of particular interest for industrial coatings and in the automobile sector. The stabilisation can be improved by inorganic components of the additional coating. Overall, the respective proportions for the additional stabilising coating should be selected in such a way that the optical properties of the effect pigments according to the invention are not significantly influenced.

The present invention likewise relates to processes for the preparation of these pigments in which $SiO_2$ flakes having a uniform layer thickness are coated with metal oxides.

The coating with metal oxides can be carried out by wet-chemical methods and/or by CVD or PVD processes.

The processes according to the invention for the preparation of the effect pigments are preferably wet-chemical processes in which use can be made of the known wet-chemical coating technology developed for the preparation of pearlescent pigments, which are described, for example, in the following publications:

DE 14 67 468, DE 19 59 988, DE 20 09 566, DE 22 14 545, DE 22 15 191, DE 22 44 298, DE 23 13 331, DE 25 22 572, DE 31 37 808, DE 31 37 809, DE 31 51 343, DE 31 51 354, DE 31 51 355, DE 32 11 602, DE 32 35 017.

For the coating, the $SiO_2$ flakes are suspended in water and coated with metal oxides by addition and precipitation of the corresponding inorganic metal compounds, with the pH necessary for the precipitation of the respective metal oxide being set and kept constant by simultaneous addition of acid or base, and the coated $SiO_2$ flakes are subsequently separated off from the aqueous suspension, dried and optionally calcined.

The calcination temperature here can be optimised with respect to the coating present in each case. In general, however, the calcination temperature is between 250 and 1000° C., in particular between 350 and 900° C.

If the layer comprises $TiO_2$, this layer is preferably applied using the process described in U.S. Pat. No. 3,553,001. In this process, an aqueous solution of an inorganic titanium salt is slowly added to a suspension of the $SiO_2$ flakes heated to about 50–100° C., in particular 70–80° C., and the pH is kept substantially constant at from 0.5 to 5, in particular from about 1.5 to 2.5, by simultaneous metered addition of a base. As soon as the desired layer thickness of the $TiO_2$ oxide hydrate has been reached, the addition of the titanium salt solution and of the base is stopped. This process is also known as the titration process and has the particular feature that there is no excess of titanium salt, but instead always only an amount as is necessary for uniform coating with the hydrated $TiO_2$ and can also be taken up by the surface of the $SiO_2$ flakes to be coated is provided per time unit. The solution therefore contains no hydrated titanium dioxide particles, which are not deposited on the surface to be coated.

In principle, CVD or PVD coating processes are also suitable for the preparation of the pigments according to the invention. It is necessary here for the $SiO_2$ flakes to be kept in uniform motion during the vapour-deposition process in order that a homogeneous coating of all surfaces is ensured.

In addition, in a process which is likewise in accordance with the invention, an organic coating can additionally be applied as outer layer. Examples of coating processes of this type are given, inter alia, in EP 0 632 109, U.S. Pat. No. 5,759,255, DE 43 17 019, DE 39 29 423, DE 32 35 017, EP 0 492 223, EP 0 342 533, EP 0 268 918, EP 0 141 174, EP 0 764 191, WO 98/13426 or EP 0 465 805. Examples of organic coatings and the associated advantages have already been described above under the structure of the pigments according to the invention. The process step of application of the organic coating can follow directly after the other steps of the process according to the invention. The substances applied here only have a proportion by weight of from 0.1 to 5% by weight, preferably from 0.5 to 3% by weight, in the pigment as a whole.

The effect pigments according to the invention can be employed in a variety of applications. Accordingly, the present invention likewise relates to the use of the pigments according to the invention in cosmetics, paints, coatings, plastics, films, in security printing, in security features in documents and identity papers, for colouring seed, for colouring foods or in medicament coatings and for the preparation of pigment compositions and dry preparations.

In the case of cosmetics, the effect pigments according to the invention are particularly suitable for products and formulations in decorative cosmetics, such as, for example, nail varnishes, colouring powders, lipsticks or eye-shadows, soaps, toothpastes, etc. The effect pigments according to the invention can of course also be combined in the formulations with cosmetic raw materials and assistants of all types. These include, inter alia, oils, fats, waxes, film formers, preservatives and assistants which generally determine the applicational properties, such as, for example, thickeners and rheological additives, such as, for example, bentonites, hectorites, silicon dioxide, Ca silicates, gelatine, high-molecular-weight carbohydrates and/or surface-active assistants, etc. The formulations comprising effect pigments according to the invention may be of the lipophilic, hydrophilic or hydrophobic type. In the case of heterogeneous formulations having discrete aqueous and non-aqueous phases, the particles according to the invention may be present in each case in only one of the two phases or alternatively distributed over both phases.

The pH values of the aqueous formulations can be between 1 and 14, preferably between 2 and 11 and particularly preferably between 5 and 8. The concentrations of the effect pigments according to the invention in the formulation are unlimited. They may—depending on the application—be between 0.001 (rinse-off products, for example shower gels) and 99% (for example lustre-effect articles for particular applications). The effect pigments according to the invention may furthermore also be combined with cosmetic active ingredients. Suitable active ingredients are, for example, insect repellents, UV A/BC protection filters (for example OMC, B3, MBC), anti-ageing active ingredients, vitamins and derivatives thereof (for example vitamin A, C, E, etc.), self-tanning agents (for example DHA, erythrulose, inter alia), and further cosmetic active ingredients, such as, for example, bisabolol, LPO, ectoine, emblica, allantoin, bioflavonoids and derivatives thereof.

On use of the effect pigments in paints and coatings, all areas of application known to the person skilled in the art are possible, such as, for example, powder coatings, automobile paints, printing inks for gravure, offset, screen or flexographic printing, and coatings in outdoor applications. The paints and coatings here may be, for example, radiation-curing, physically drying or chemically curing. For the preparation of printing inks or liquid coatings, a multiplicity of binders, for example based on acrylates, methacrylates, polyesters, polyurethanes, nitrocellulose, ethylcellulose, polyamide, polyvinyl butyrate, phenolic resins, maleic resins, starch or polyvinyl alcohol, amino resins, alkyd resins, epoxy resins, polytetrafluoroethylene, polyvinylidene fluorides, polyvinyl chloride or mixtures thereof, in particular water-soluble grades, are suitable. The coatings can be powder coatings or water- or solvent-based coatings, where the choice of the coating constituents is subject to the general knowledge of the person skilled in the art. Common polymeric binders for powder coatings are, for example, polyesters, epoxides, polyurethanes, acrylates or mixtures thereof.

In addition, the effect pigments according to the invention can be used in films and plastics, thus, for example, in agricultural sheeting, infrared-reflective films and sheets, gift foils, plastic containers and mouldings for all applications known to the person skilled in the art. Suitable plastics for incorporation of the effect pigments according to the invention are all common plastics, for example thermosets or thermoplastics. A description of the possible applications and suitable plastics, processing methods and additives is given, for example, in RD 472005 or in R. Glausch, M. Kieser, R. Maisch, G. Pfaff, J. Weitzel, Periglanzpigmente [Pearlescent Pigments], Curt R. Vincentz Verlag, 1996, 83 ff., the disclosure content of which is incorporated herein.

In addition, the effect pigments according to the invention are also suitable for use in security printing and in security-relevant features for, for example, counterfeiting-proof cards and identity papers, such as, for example, entry tickets, personnel identity cards, banknotes, cheques and cheque cards and for other counterfeiting-proof documents. Due to the fact that the colour runs over all four quadrants of the a,b colour coordinate system, the pigments according to the invention are unambiguously detectable and distinguishable from other colour-flop pigments. This makes it more difficult for imitators to use effect pigments for counterfeiting articles of value as a direct visual comparison shows whether simple pigments or the pigments according to the invention are on the article of value. In the area of agriculture, the effect pigments can be used for colouring seed and other starting materials, in addition in the foods sector for pigmenting foods. The effect pigments according to the invention can likewise be employed for pigmenting coatings in medicaments, such as, for example, tablets or dragees.

In the above-mentioned areas of application, the effect pigments according to the invention are likewise suitable for use in mixtures with organic dyes and/or pigments, such as, for example, transparent and opaque white, coloured and black pigments, and with flake-form iron oxides, organic pigments, holographic pigments, LCPs (liquid crystal polymers) and conventional transparent, coloured and black lustre pigments based on metal oxide-coated flakes based on mica, glass, $Al_2O_3$, $Fe_2O_3$, $SiO_2$, etc. The effect pigments according to the invention can be mixed with commercially available pigments and fillers in any ratio.

Fillers which may be mentioned are, for example, natural and synthetic mica, nylon powder, pure or filled melamine resins, talc, glasses, kaolin, oxides or hydroxides of aluminium, magnesium, calcium, zinc, BiOCl, barium sulfate, calcium sulfate, calcium carbonate, magnesium carbonate, carbon, and physical or chemical combinations of these substances. There are no restrictions regarding the particle shape of the filler. It can be flake-form, spherical or needle-shaped, for example, in accordance with requirements.

The effect pigments according to the invention are furthermore suitable for the preparation of flowable pigment compositions and dry preparations comprising one or more particles according to the invention, binders and optionally one or more additives. The term dry preparations is also taken to mean preparations which comprise from 0 to 8% by weight, preferably from 2 to 8% by weight, in particular from 3 to 6% by weight, of water and/or of a solvent or solvent mixture. The dry preparations are preferably in the form of pellets, granules, chips, sausages or briquettes and have particle sizes of 0.2–80 mm. The dry preparations are used, in particular, in the preparation of printing inks and in cosmetic formulations.

The complete disclosure content of all patent applications, patents and publications mentioned above is incorporated into this application by way of reference.

The following examples are intended to explain the invention in greater detail, but without restricting it.

EXAMPLES

Example 1

$Fe_2O_3/SiO_2$ Pigment 100 g of $SiO_2$ flakes (540 nm in thickness) are heated to 75° C. in 2 l of demineralised water. 172 ml of $FeCl_3$ solution (corresponds to 20% of $Fe_2O_3$ by weight based on the total weight of the resulting pigment) are added with stirring. The pH of the reaction mixture is kept constant at 3 by addition of sodium hydroxide solution (30%). After addition of the $FeCl_3$ solution, the pH is raised to pH 5 using sodium hydroxide solution (32%). The product is filtered off and rinsed with demineralised water. After drying at 110° C., the product is calcined at 800° C.

The pigment prepared in this way exhibits the colour behaviour shown in FIG. 1 (-●-) on tilting a paint card from 90 degrees to 180 degrees. All four quadrants in the a,b colour system are passed through in the process. The pigment according to the invention thus exhibits an all-round flop.

Comparative Example $Fe_2O_3/SiO_2$ Pigment According to WO 93/08237

100 g of $SiO_2$ flakes (445 nm in thickness) are heated to 75° C. in 1 l of demineralised water. 237 ml of $FeCl_3$ solution (corresponds to 27.5% of $Fe_2O_3$ by weight based on the total weight of the resulting pigment) are added with stirring. The pH of the reaction mixture is kept constant at 3 by addition of sodium hydroxide solution (30%). After addition of the $FeCl_3$ solution, the pH is raised to pH 5 using sodium hydroxide solution (30%). The product is filtered off and rinsed with demineralised water. After drying at 110° C., the product is calcined at 800° C.

The pigment prepared in this way exhibits the colour behaviour shown in FIG. 1 (-♦-) on tilting a paint card from 90 degrees to 180 degrees. Only two quadrants in the a,b colour system are passed through in the process.

BRIEF DESCRIPTION OF DRAWINGS

FIG. 1 illustrates comparison of the colour changes in the a,b colour system between pigments according to the invention and comparative pigments The entire disclosures of all applications, patents and publications, cited herein and of corresponding German application No. 102005001997.8, filed Jan. 17, 2005 are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. Effect pigments having a color flop comprising $SiO_2$ flakes having a uniform layer thickness of 520 to 560 nm which are coated with one or more metal oxide layers, wherein the thickness of the one or more metal oxide layers is 15 to 40 nm, and wherein the color flop runs through all four quadrants of the a,b colour coordinate system (CIELAB L,a,b system).

2. Effect pigments according to claim 1, which have a total dry layer thickness, wherein the $SiO_2$ flakes having a uniform layer thickness have a layer-thickness tolerance that is 3 to 10% of the total dry layer thickness.

3. Effect pigments according to claim 1, wherein the $SiO_2$ flakes have a diameter that is 1 to 250 μm.

4. Effect pigments according to claim 1, wherein the metal oxide is iron oxide and/or titanium dioxide.

5. Effect pigments according to claim 4, wherein the iron oxide is haematite (α-$Fe_2O_3$) and the titanium dioxide is rutile.

6. Effect pigments according to claim 1, wherein an organic coating is additionally applied to the effect pigments.

7. Effect pigments according to claim 1, wherein the thickness of the one or more metal oxide layers is 20 to 35 nm.

8. Effect pigments according to claim 1, wherein the thickness of the $SiO_2$ flakes is 530 to 550 nm.

9. Effect pigments according to claim 1, wherein
530 nm thick $SiO_2$ flakes are coated with $Fe_2O_3$ having a layer thickness of 20 nm,
530 nm thick $SiO_2$ flakes are coated with $Fe_2O_3$ having a layer thickness of 35 nm,
555 nm thick $SiO_2$ flakes are coated with $Fe_2O_3$ having a layer thickness of 20 nm, or
555 nm thick $SiO_2$ flakes are coated with $Fe_2O_3$ having a layer thickness of 35 nm.

10. Effect pigments according to claim 1, wherein the thickness of the $SiO_2$ flakes is 540 nm.

11. Effect pigments according to claim 1, which are coated with $Fe_2O_3$.

12. A process for preparing effect pigments according to claim 1, comprising coating the $SiO_2$ flakes having a uniform layer thickness with a metal oxide.

13. A process according to claim 12, wherein the coating with metal oxide is carried out by a wet-chemical method and/or by a CVD and/or PVD process.

14. A process according to claim 12, wherein the metal oxide is iron oxide and/or titanium dioxide.

15. A cosmetic product, paint, coating, plastic article, film, security printing, security feature in a document or identity paper, a seed, a food product, a medicament, or a pigment composition or dry preparation comprising effect pigments according to claim 1.

* * * * *